(12) United States Patent
Begg

(10) Patent No.: US 9,671,024 B2
(45) Date of Patent: Jun. 6, 2017

(54) METHOD AND DEVICE OF A SEALING SYSTEM

(75) Inventor: Alan Robert Begg, Gothenburg (SE)

(73) Assignee: AKTIEBOLAGET SKF, Gothenburg (SE)

(*) Notice: Subject to any disclaimer, the term of this patent is extended or adjusted under 35 U.S.C. 154(b) by 69 days.

(21) Appl. No.: 13/515,061

(22) PCT Filed: Dec. 14, 2010

(86) PCT No.: PCT/EP2010/007615
§ 371 (c)(1),
(2), (4) Date: Sep. 10, 2012

(87) PCT Pub. No.: WO2011/079905
PCT Pub. Date: Jul. 7, 2011

(65) Prior Publication Data
US 2013/0001887 A1    Jan. 3, 2013

Related U.S. Application Data

(60) Provisional application No. 61/288,737, filed on Dec. 21, 2009.

(51) Int. Cl.
*F16J 15/3204* (2016.01)
*F16J 15/3284* (2016.01)

(52) U.S. Cl.
CPC ....... *F16J 15/3204* (2013.01); *F16J 15/3284* (2013.01)

(58) Field of Classification Search
CPC .......................... F16J 15/3204; F16J 15/3284
USPC ..... 277/564, 569; 428/411.1, 420, 421, 422, 428/474.4
See application file for complete search history.

(56) References Cited

U.S. PATENT DOCUMENTS

| | | | | | |
|---|---|---|---|---|---|
| 2,208,482 | A | * | 7/1940 | Victor | 277/569 |
| 2,208,700 | A | * | 7/1940 | Murden | 277/565 |
| 2,213,116 | A | * | 8/1940 | Bernstein | 277/569 |
| 2,227,771 | A | * | 1/1941 | Victor et al. | 277/569 |
| 2,804,324 | A | * | 8/1957 | Stallings | 277/569 |
| 2,804,325 | A | * | 8/1957 | Riesing | 277/559 |
| 2,826,441 | A | * | 3/1958 | Niessen | 277/574 |
| 3,104,883 | A | * | 9/1963 | English et al. | 277/335 |

(Continued)

FOREIGN PATENT DOCUMENTS

| | | |
|---|---|---|
| DE | 4035658 A1 | 5/1992 |
| DE | 4201340 C1 | 9/1993 |

(Continued)

OTHER PUBLICATIONS

Alan Hall, The photoinitiated cyclopolymerization of dienes in the creation of novel, polymeric systems and three-dimensional networks, Jul. 23, 2004, University of Hull.*

*Primary Examiner* — Kristina Fulton
*Assistant Examiner* — L. Susmitha Koneru
(74) *Attorney, Agent, or Firm* — Bryan Peckjian; SKF USA Inc. Patent Dept.

(57) ABSTRACT

A sealing system and a method of manufacturing such a sealing system. The sealing system comprises a seal lip of two different materials that are bonded together using a polymeric material that forms strong chemical bonds with the two different materials at the same time. Further since the bonding only takes place after activation, this enables a precise physical alignment to be done before the activation.

12 Claims, 1 Drawing Sheet

(56) References Cited

U.S. PATENT DOCUMENTS

| | | | | |
|---|---|---|---|---|
| 3,495,843 | A * | 2/1970 | Andersen et al. | 277/505 |
| 3,938,813 | A * | 2/1976 | Forch | 277/569 |
| 4,125,266 | A * | 11/1978 | Schonherr et al. | 277/573 |
| 4,239,243 | A * | 12/1980 | Bainard et al. | 277/559 |
| 4,311,316 | A * | 1/1982 | Cather, Jr. | 277/309 |
| 4,504,067 | A * | 3/1985 | Cather, Jr. | F16J 15/322 |
| | | | | 277/569 |
| 4,613,143 | A * | 9/1986 | Butler | 277/569 |
| RE33,192 | E * | 4/1990 | Bainard et al. | 264/266 |
| 5,013,052 | A * | 5/1991 | Butler et al. | 277/402 |
| 5,431,872 | A * | 7/1995 | Sink | 264/161 |
| 5,577,741 | A * | 11/1996 | Sink | 277/559 |
| 5,807,639 | A * | 9/1998 | Frappier et al. | 428/475.5 |
| 6,050,570 | A * | 4/2000 | Otto | 277/351 |
| 6,729,624 | B1 * | 5/2004 | Johnston | 277/560 |
| 2004/0245729 | A1 * | 12/2004 | Bock et al. | 277/569 |
| 2005/0155293 | A1 * | 7/2005 | Dron | 49/490.1 |
| 2006/0083696 | A1 * | 4/2006 | Yu et al. | 424/59 |
| 2006/0279046 | A1 * | 12/2006 | Vogt et al. | 277/549 |
| 2007/0045967 | A1 * | 3/2007 | Park | 277/534 |
| 2007/0190284 | A1 * | 8/2007 | Park | 428/66.4 |
| 2008/0237045 | A1 * | 10/2008 | Montminy et al. | 204/554 |
| 2013/0119615 | A1 * | 5/2013 | Horton et al. | 277/500 |

FOREIGN PATENT DOCUMENTS

| | | |
|---|---|---|
| DE | 10340802 A1 | 4/2005 |
| EP | 1900759 A2 | 3/2008 |
| JP | H07227928 A | 8/1995 |
| JP | 2006002788 A | 1/2006 |

* cited by examiner

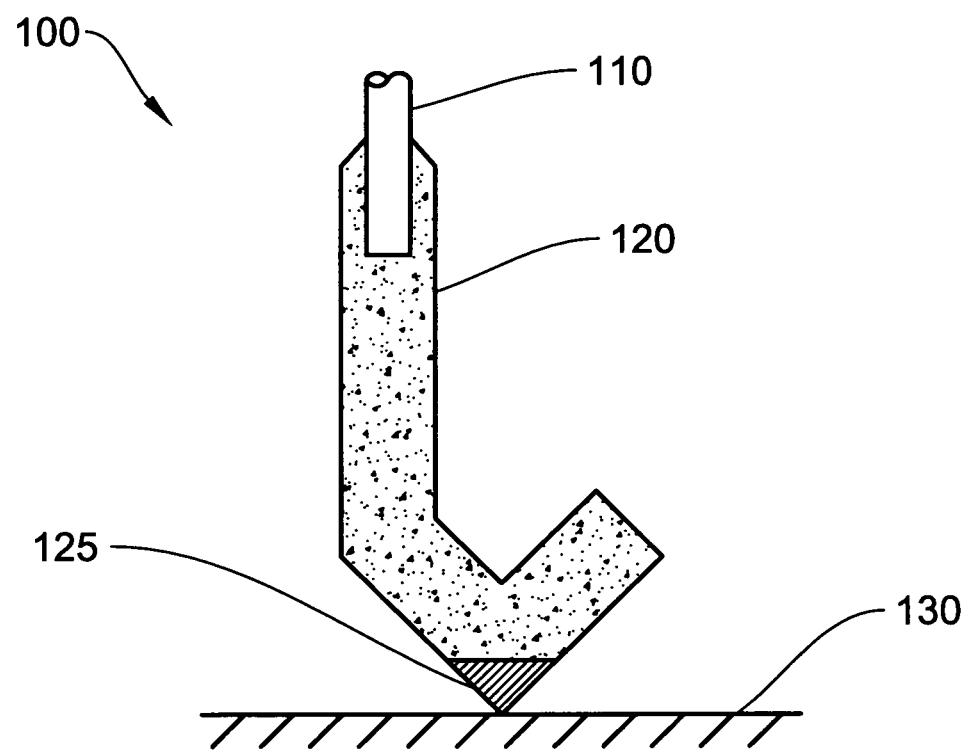

METHOD AND DEVICE OF A SEALING SYSTEM

CROSS-REFERENCE

This application is the U.S. national stage of International Application No. PCT/EP2010/007615 filed on Dec. 14, 2010, which claims priority to U.S. Provisional Application 61/288,737 filed Dec. 21, 2009.

TECHNICAL FIELD

The invention concerns sealing systems and is directed in certain embodiments to seals with dual material lips, as well as the bonding of the two lip materials.

BACKGROUND

Sealing systems, such as lip seals, are used in automotive and industrial rotating applications where oil leakage and ingress contamination should be minimized or eliminated as much as possible. Sealing systems are used in rolling element bearing applications or as a standalone system. In low weight vehicle and truck applications, the sealing system is used in crankshaft and transmission applications and axle hub units. In industry, sealing systems are used in transmissions or included in rolling element bearings to protect against contamination.

Lip seals traditionally comprise a metal casing having a radial wall on which a rubber or polymeric lip is attached and which is in contact with a rotating shaft. During operation, the shaft generally exhibits some degree of misalignment that needs to be accommodated or compensated by the lip.

The ability of the lip to closely follow the surface of the shaft is critical to prevent any leakage and ingress. This is achieved by allowing the lip to move with ease at the contact of the shaft, while still maintaining some contact force at the tip.

Rotating lip seals are a significant contributor to energy dissipation and loss of efficiency of mechanical components: in rolling element bearings, up to 70% of the friction contribution is caused by the seal alone. In automotive applications, it has been estimated that 1 to 2% of $CO_2$ reduction can be obtained by better sealing applications.

There is still room for improvements in sealing systems in general and in seal lips in particular.

SUMMARY

It is an object to disclose a sealing system that allows a lip to move with ease at the contact of a shaft, while still maintaining an adequate contact force at the tip.

In a first aspect of the present disclosure, a low friction lip sealing system/seal lip for greased and oil lubricated rotating applications is provided for preventing leakage and ingress contamination in static and dynamic operating conditions. A dual material lip is preferably utilized to achieve a long service life for the sealing applications and to maximize friction reduction. The bonding between the two materials of the lip is achieved using specifically tailored polymeric materials that cure by application of UV light, heat, and/or other radiation, such as are described in EP 1 900 759.

In a preferred embodiment, a sealing system preferably comprises a metal casing having a radial wall on which a rubber or polymeric lip is attached and which in turn is in contact with a rotating shaft or other suitable opposing surface. During operation, the shaft and/or opposing surface normally exhibit(s) some degree of misalignment that needs to be accommodated or compensated by the lip. The ability of the lip to follow the surface of the shaft or opposing surface is critical to prevent any leakage and/or ingress. This is achieved by allowing the lip to move with ease at the contact of the shaft, while still maintaining an adequate contact force at the tip.

The ability of the lip to remain in contact with the shaft is important to the selection of the material and the design of the lip, as a certain degree of springiness or elasticity is preferable. In rotating lip seal applications, the material of the lip is traditionally one of the various types of rubber. In some seal applications, Polytetrafluoroethylenes (PTFE) are also used. In this case the lip is made extremely thin and this compensates for the higher rigidity of the material.

The reduction of friction and wear, which occur at the tip of the lip, however requires different material criteria or properties than the material criteria or properties that are optimal for maintaining the contact force at the tip. Therefore the development of a sealing system using a single material for the lip is by definition a compromise. A consequence is that the contact force at the tip and the friction reduction/wear resistance cannot be maximized using the single material lip technology.

To overcome these limitations, it is preferable to manufacture the lip from at least two different materials, e.g., material A and material B. The main volume or bulk of the lip is preferably made of material A and the tip or the skin (e.g., a contact surface) of the lip is preferably made of material B. Material A may be chosen to ensure good flexibility of the lip and good contact conditions around the circumference of the shaft. Material B may be chosen to provide low friction conditions and good wear resistance.

Because a low-friction contact should be maintained over the complete service life of the sealing system, the two different materials can be selected in accordance with the expected operating temperature and aggressiveness of the lubricant. Hence materials A and B can, according to another aspect of the present disclosure, suitably be a combination of the following materials: Acrylonitrile Butadiene Rubbers (NBR) Hydrogenated Nitrile Rubbers (HNBR), Carboxylated Nitrile Rubber (XNBR), Polyacrylate Rubbers (ACM), Polyurethane Rubbers (PU), Copolymers based on Vinylidene Fluoride and Hexafluoropropylene (FKM). The formulation of these materials can be further optimized by suitable selection of a filler or filler system and curing systems.

In addition to elastomeric materials, which are a standard choice in rotating lip seal technologies, the present teachings can make use of new combinations of materials such as Polytetrafluoroethylenes (PTFE), Polyamides (PA), thermoplastic vulcanizates (TPV) and thermoplastic elastomers (TPE).

To ensure a reliable and effective bonding over the complete life of the seal, it is preferable to use an efficient adhesion promoter to bond material A and material B together. A suitable class of adhesion promoters based on polymeric materials, more specifically diene compounds, are described in EP 1 900 759. In this disclosure, the adhesion agent is made from a starting material that includes at least two double bonds, which are activated so that they take part in a polymerisation reaction and wherein the double bonds are sufficiently close together to ensure that cyclopolymerisation will occur.

The cyclopolymerisation is triggered by applying a source of radiation, UV or thermal radiation. This technology is different from the common UV curing system such as acrylates and methacrylates as the use of these polymers can limit in some circumstances the properties which can be obtained in the final product. The polymeric material allows significantly different properties to be obtained as compared to acrylates and methacrylates, such as adhesion to metal surfaces, low cost, ease of derivatization and speed of processing. For these reasons, they are particularly well suited to rubber and polymeric technologies such as are commonly utilized in rotating lip seals.

In another aspect of the present disclosure a sealing system and a method of bonding different parts of the sealing system is provided that can avoid or minimize costly mechanical alignment, since the adhesion is initiated only after activation by for example UV radiation.

Trials of bonding sealing rubbers with traditional glues have proved difficult. It can be extremely difficult to bond two different materials, as some bonding agents have limited strengths, and others are apt to weakening or even breakage if subjected to low temperatures.

The dual material technology disclosed herein enables the friction reduction to be maximized by selecting an optimum material for the (contact) surface of the lip independently of that for the bulk of the lip. The materials are chosen to ensure that the lip can closely follow an opposing surface during operation and to maintain good contact conditions at the tip of the lip.

The selection of a low friction material for the contact surface decreases the temperature at the lip during operation and ensures a longer life of the sealing system.

A strong bonding can be obtained between the material used for the contact surface (tip) and the one used for the bulk of the lip by using an adhesion promoter, which makes use of polymeric materials such as described in EP 1 900 759.

The use of polymeric materials such as described in EP 1 900 759 allows a wide range of combinations of materials for the lip and the contact surface of the lip to be used. For rubber sealing materials, this technology also allows different curing systems for the surface and the lip to be used. For PTFE seals, such a technology avoids the need to pre-treat the surface and plasma etching.

The different lip materials bonded according to the present teachings can be combined in any desired manner.

BRIEF DESCRIPTION OF THE DRAWING

The invention will now be explained in more detail with reference to the following FIGURE, in which FIG. 1 illustrates a representative seal system according to the present teachings.

DETAILED DESCRIPTION

A sealing system according to the following preferred embodiments may be used, without limitation, in automotive and industrial rotating applications where low friction is in demand and oil leakage and ingress contamination should be minimized or eliminated as much as possible. Such a sealing system can be used in rolling element bearing applications or as a standalone system. In low weight vehicle and truck applications, the sealing system can be used in crankshaft and transmission applications and axle hub units. In industry, the present dual-material sealing systems can be used in transmissions or included in rolling element bearings to protect against contamination, retain lubricant within the bearing and reduce friction as compared to a single-material seal lip, and can be advantageously utilized in harsh environments.

Representative examples will now be described in connection with FIG. 1.

FIG. 1 illustrates a presently preferred application of a sealing system 100 according to the present teachings. The sealing system comprises a metal casing 110 having a radial wall on which a rubber or polymeric lip 120, 125 is attached and which in use is in contact with a rotating shaft or opposing surface 130. During operation, the shaft or opposing surface 130 will normally exhibit some degree of misalignment that needs to be accommodated or compensated by the lip. The ability of the lip to follow the surface of the shaft is critical to prevent any leakage and ingress. This is achieved by allowing the lip to move with ease at the contact of the shaft, while still maintaining some contact force at the tip 125.

The ability of the lip to remain in contact with the shaft is often very important for the selection of the material and the design of the lip. In rotating lip seal applications, the material of the lip is generally rubber of different types.

The reduction of friction and wear, which occur at the tip of lip, however requires different material criteria than the criteria that are optimal for maintaining the contact. Therefore the use of a sealing system that consists of a single lip material is by definition a compromise. A consequence is that friction reduction and wear resistance cannot be maximized using the single material lip technology.

To overcome these limitations, a lip is preferably comprised of two materials A and B. The main volume or bulk 120 of the lip is made of material A and the tip 125 or the skin (contact surface) of the lip is made of material B. Material A is chosen to ensure good flexibility of the lip and good contact conditions around the circumference of the shaft. Material B is chosen to provide a low coefficient of friction when in sliding contact with the opposing surface 130 and good wear resistance.

Bulk and Surface Materials: Because a low-friction contact is advantageously maintained over the complete life of the sealing system, the two different materials (A and B) are preferably selected in accordance with the expected operating temperature and the aggressiveness of the lubricant. Hence materials A and B can be respectively selected from the following materials: Acrylonitrile Butadiene Rubbers (NBR) Hydrogenated Nitrile Rubbers (HNBR), Carboxylated Nitrile Rubber (XNBR), Polyacrylate Rubbers (ACM), Polyurethane Rubbers (PU), Copolymers based on Vinylidene Fluoride and Hexafluoropropylene (FKM). The formulation of these materials can be further optimized by suitable selection of one or more fillers or other additives as well as a suitable selection of the curing system.

In addition to elastomeric materials, which are a standard choice in rotating lip seal technologies, the present teachings also encompass the use of new combinations of materials such as one or more of Polytetrafluoroethylenes (PTFE), Polyamides (PA), thermoplastic vulcanizates (TPV) and thermoplastic elastomers (TPE).

When using Polytetrafluoroethylenes (PTFE) as material B in a seal according to the present teachings, it is not necessary to make an extremely thin lip section. Instead the form and thickness can be optimized for friction and wear, even making use of the higher rigidity of the material.

Examples (Quantities in Grams)

(1) Acrylonitile-Butadiene Seal

| | |
|---|---|
| Europrene ® N 3330 GRN | 100 |
| ZnO | 5 |
| Stearic acid | 1 |
| N 330 | 40 |
| DOP | 5 |
| Mistron Vapor ® | 25 |
| Graphite | 10 |
| Coumarone resin | 2 |
| Vulkanox ® MB2 | 1.5 |
| Vulkanox ® HS | 0.5 |
| CBS 1. | 5 |
| TMTD | 2.5 |
| Sulphur | 0.4 |

Press cure 10 min at 170° C.

(2) Fluoroelastomer Seals

| | |
|---|---|
| Tecnoflon ® FOR 60K | 100 |
| Magnesium Oxide (High Activity) | 9 |
| Calcium Hydroxide | 6 |
| Barium Sulfate | 30 |
| Polymist ® L206 | 30 |
| Red Iron Oxide | 5 |
| Carnuba Wax | 2 |

Press Cure 10 minutes @ 170° C.
Post Cure 8 hours + 16 hours @ 230° C.

(3) Acrylate Seals

| | |
|---|---|
| Vamac ® G | 100.0 |
| Stearic Acid | 1.0 |
| Armeen 18D | 0.5 |
| VANFRE ® VAM | 2.0 |
| FEF Black (N-550) | 60.0 |
| Graphite | 20.0 |
| Dioctyl Phthalate (DOP) | 10.0 |
| VANOX ® ZMTI | 2.0 |
| VANOX ® AM | 1.0 |
| VANAX ® DOTG | 4.0 |
| DIAK ® No. 1 | 1.25 |

Adhering the two materials: To obtain a long service-life, in particular in very severe and hostile environments, a good bonding between material A and material B is essential for the successful operation of the sealing system. The natural bonding of rubber to other materials during vulcanization when they are cross-linked is not sufficient. Besides, this solution cannot be used when Polytetrafluoroethylenes (PTFE), Polyamides (PA), thermoplastic vulcanizates (TPV) and thermoplastic elastomers (TPE) are selected for material A and B.

To ensure an effective bonding over the complete life of the seal, an adhesion promoter based on polymeric materials such as are described in EP 1 900 759 is used to bond material A and material B together.

As described in EP 1 900 759, the polymeric material between the two bonds can be tailored by adding specific chemical functions, which promote the reaction and coupling with specific substrates. Hence, a first chemical function of the polymeric material can be added to create chemical bonds with material A, while a second chemical function can be added to create in the same manner chemical bonds with material B. In this manner a strong and permanent bonding can be achieved between the surfaces of material A and material B. The use of these technologies allows a strong bonding to develop between the surfaces and the use of a multiple combination of materials for the sealing system.

The cyclopolymerisation is triggered by applying a source of radiation, e.g., UV or thermal radiation. This technology is different from the common UV curing system such as acrylates and methacrylates as the use of these polymers can limit in some circumstances the properties which can be obtained in the final product. The technology presented allows significantly different properties to be obtained as compared to acrylates and methacrylates, such as adhesion to metal surfaces, low cost, ease of derivatization and speed of processing. For these reasons, they are particularly suited to rubber and polymeric technologies such as are commonly utilized in rotating lip seals.

In summary, a seal lip is preferably comprised of two different materials bonded together by a polymeric material that forms strong chemical bonds with the two different materials at the same time. Further since the bonding or adhesion only takes place after activation, this will allow a precise physical alignment to be done before activation.

The contents of EP 1 900 759 and its counterpart U.S. Pat. No. 6,559,261 are fully incorporated herein by reference. It is expressly noted that the adhesive compounds disclosed in paragraph [0007] and the photoinitiators disclosed in paragraph [0013] of EP 1 900 759 are incorporated herein by reference, which text corresponds to column 1, line 53 to column 2, line 38 and column 3, line 18 to column 4, line 10 of U.S. Pat. No. 6,559,261.

The invention is not restricted to the above-described embodiments, but may be varied within the scope of the following claims.

FIG. 1—Illustrates a Representative Application of the Present Invention:

100 a sealing system, a lip seal
110 a metal casing
120 a bulk part of a lip
125 a tip part of a lip
130 a opposing surface such as a shaft or a bearing part

The invention claimed is:

1. A seal comprising:
a first material bonded to a second material by a cyclopolymerized adhesive agent, the first and second material having different properties and the adhesive agent being formed by subjecting a starting material which comprises a group of sub-formula I:

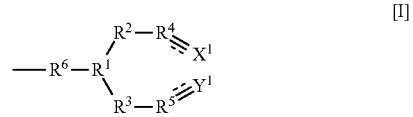

[I]

where $R^1$ is $CR^a$ where $R^a$ is hydrogen or alkyl, and $R^6$ is a bond, or $R^1$ and $R^6$ together form an electron withdrawing group;
wherein either (i) $R^1$ is a group $N^+R^{12}(Z^{m-})_{1/m}$, $S(O)_pR^{13}$, B, $P(O)_qR^{14}$ or $Si(R^{15})$ where $R^{12}$, $R^{13}$, $R^{14}$ and $R^{15}$ are independently selected from hydrogen or hydrocarbyl, Z is an anion of charge m, p is 0, 1 or 2, and q is 1 or 2; and $R^6$ is a bond; or (ii) $R^1$ is a nitrogen atom and $R^6$ is $C(O)$ or $S(O)_2$; or (iii) $R^1$ is a CH group and $R^6$ is a group $OC(O)$, $C(O)$ or $S(O)_2$;
$R^2$ and $R^3$ are independently selected from $(CR^7R^8)_n$, or a group $CR^9R^{10}$, $CR^7R^8CR^9R^{10}$ or $CR^9R^{10}C^7R^8$ where n is 0, 1 or 2, $R^7$ and $R^8$ are independently selected from hydrogen or alkyl, and either one of $R^9$ or $R^{10}$ is hydrogen and the other is an electron withdrawing group given by nitrile, trifluoromethyl, acyl or nitro, or $R^9$ and $R^{10}$ together with the carbon atom to which they are attached form an electron withdrawing group given by carbonyl;

$R^4$ and $R^5$ are independently selected from CH or $CR^{11}$ where $R^{11}$ is an acyl, nitrile or nitro electron withdrawing group;

the dotted lines indicate the presence or absence of a bond, and $X^1$ is a group $CX^2X^3$ where the dotted line bond to which it is attached is absent and a group $CX^2$ where the dotted line bond to which it is attached is present, $Y^1$ is a group $CY^2Y^3$ where the dotted line bond to which it is attached is absent and a group $CY^2$ where the dotted line bond to which it is attached is present, and $X^2$, $X^3$, $Y^2$ and $Y^3$ are independently selected from hydrogen and fluorine;

provided that at least one of (a) $R^1$ and $R^6$ or (b) $R^2$ and $R^3$ or (c) $R^4$ and $R^5$ includes an electron withdrawing group which is able to activate a cyclopolymerization reaction;

to suitable conditions under which a cyclopolymerization reaction will occur upon being subjected to ultraviolet or thermal radiation, subject to the following further provisos:

(i) that the starting material is other than triallyamine hydrochloride;

(ii) that when $R^1$ and $R^6$ together form the sole electron withdrawing group and $R^1$ is a group $N^+R^{12}(Z^{m-})_{1/m}$, where $R^{12}$ is hydrogen or hydrocarbyl, Z is an anion of charge m and $R^6$ is a bond, said conditions are subjecting the compound to radiation in the substantial absence of a solvent or sulphur dioxide gas; and (iii) that where $R^1$ and $R^6$ together form the sole electron withdrawing group and $R^1$ is CH and $R^6$ is OC(O), then the compound does not further contain a mesogenic group, or contains at least one further group of sub-formula (I).

2. The seal according to claim 1, wherein the first material forms a main portion of the seal and the second material forms a contact surface of the seal.

3. The seal according to claim 2, wherein the first material is rubber.

4. The seal according to claim 3, wherein the second material comprises a polytetrafluoroethylene (PTFE) or a polyamide (PA) or a thermoplastic vulcanizate (TPV) or a thermoplastic elastomer (TPE).

5. The seal according to claim 4, wherein the second material is configured to form a seal with a moving structure.

6. The seal according to claim 1, wherein the seal is a shaft seal, wherein the second material is configured to form a seal with a rotating shaft and wherein the first material, when mounted to a structure fixed with respect to a rotational axis of the shaft, is configured to press the second material against the shaft with a predetermined force.

7. A seal comprising:
a body member formed of a first material having a first set of material properties;
a seal member formed from a second material different than the first material and having a second set of material properties different than the first set of material properties; and
an adhesive material different than the first material and the second material and having a third set of material properties different than the first set of material properties and different than the second set of material properties, the adhesive material bonding the body member to the seal member;
wherein the adhesive material is bonded to the second material by activating, using radiation, ultraviolet or heat, at least two double bonds of each molecule of a starting material, the at least two double bonds being sufficiently close such that the at least two double bonds take part in a cyclopolymerization reaction with the second material and the starting material forms a cyclopolymer with the second material.

8. The seal according to claim 7, wherein the first material is rubber.

9. The seal according to claim 8, wherein the second material comprises a polytetrafluoroethylene (PTFE) or a polyamide (PA) or a thermoplastic vulcanizate (TPV) or a thermoplastic elastomer (TPE).

10. The seal according to claim 7, wherein the seal member is configured to form a seal with a moving structure.

11. The seal according to claim 7, wherein the seal comprises a shaft seal, wherein the seal member is configured to form a seal with a rotating shaft and wherein the body member, when mounted to a structure fixed with respect to a rotational axis of the shaft, is configured to press the seal member against the shaft with a predetermined force.

12. A seal comprising:
a lip providing at least two materials having different properties, the two materials being bonded by an adhesive agent,
wherein the adhesive agent is produced by a method comprising subjecting a starting material which comprises a group of sub-formula I:

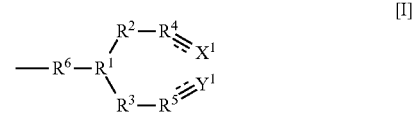

[I]

where $R^1$ is $CR^a$ where $R^a$ is hydrogen or alkyl, and $R^6$ is a bond, or $R^1$ and $R^6$ together form an electron withdrawing group;

wherein either (i) $R^1$ is a group $N^+R^{12}(Z^{m-})_{1/m}$, $S(O)_pR^{13}$, B, $P(O)_qR^{14}$ or $Si(R^{15})$ where $R^{12}$, $R^{13}$, $R^{14}$ and $R^{15}$ are independently selected from hydrogen or hydrocarbyl, Z is an anion of charge m, p is 0, 1 or 2, and q is 1 or 2; and $R^6$ is a bond; or (ii) $R^1$ is a nitrogen atom and $R^6$ is C(O) or $S(O)_2$; or (iii) $R^1$ is a CH group and $R^6$ is a group OC(O), C(O) or $S(O)_2$;

$R^2$ and $R^3$ are independently selected from $(CR^7R^8)_n$, or a group $CR^9R^{10}$, $CR^7R^8CR^9R^{10}$ or $CR^9R^{10}CR^7R^8$ where n is 0, 1 or 2, $R^7$ and $R^8$ are independently selected from hydrogen or alkyl, and either one of $R^9$ or $R^{10}$ is hydrogen and the other is an electron withdrawing group given by nitrile, trifluoromethyl, acyl or nitro, or $R^9$ and $R^{10}$ together with the carbon atom to which they are attached form an electron withdrawing group given by carbonyl;

$R^4$ and $R^5$ are independently selected from CH or $CR^{11}$ where $R^{11}$ is an acyl, nitrile or nitro electron withdrawing group;

the dotted lines indicate the presence or absence of a bond, and $X^1$ is a group $CX^2X^3$ where the dotted line bond to which it is attached is absent and a group $CX^2$ where the dotted line bond to which it is attached is present, $Y^1$ is a group $CY^2Y^3$ where the dotted line bond to which it is attached is absent and a group $CY^2$ where the dotted line bond to which it is attached is present, and $X^2$, $X^3$, $Y^2$ and $Y^3$ are independently selected from hydrogen and fluorine;

provided that at least one of (a) $R^1$ and $R^6$ or (b) $R^2$ and $R^3$ or (c) $R^4$ and $R^5$ includes an electron withdrawing group which is able to activate a cyclopolymerization reaction;

to suitable conditions under which a cyclopolymerization reaction will occur with at least one of the first material and the second material upon being subjected to ultraviolet or thermal radiation, subject to the following further provisos:

(i) that the starting material is other than triallyamine hydrochloride;

(ii) that when $R^1$ and $R^6$ together form the sole electron withdrawing group and $R^1$ is a group $N^+R^{12}(Z^{m-})_{1/m}$, where $R^{12}$ is hydrogen or hydrocarbyl, Z is an anion of charge m and $R^6$ is a bond, said conditions are subjecting the compound to radiation in the substantial absence of a solvent or sulphur dioxide gas; and (iii) that where $R^1$ and $R^6$ together form the sole electron withdrawing group and $R^1$ is CH and $R^6$ is OC(O), then the compound does not further contain a mesogenic group, or contains at least one further group of sub-formula (I).

* * * * *